United States Patent [19]
Kistler et al.

[11] Patent Number: 6,033,723
[45] Date of Patent: Mar. 7, 2000

[54] METHOD AND APPARATUS FOR COATING PLURALITY OF WET LAYERS ON FLEXIBLE ELONGATED WEB

[75] Inventors: Stephan F. Kistler, Minneapolis; Kenneth E. Palmquist, Orono; Michelle L. Toy; Wayne P. Ulwelling, both of North Saint Paul, all of Minn.

[73] Assignee: Imation Corp., Oakdale, Minn.

[21] Appl. No.: 09/028,625

[22] Filed: Feb. 24, 1998

[51] Int. Cl.$^7$ .................................................. B05D 5/12
[52] U.S. Cl. .................... 427/131; 427/172; 427/356; 427/428; 118/249; 118/261; 118/304; 118/407; 118/419
[58] Field of Search ..................... 427/128, 171, 427/172, 356, 428, 131; 118/249, 261, 304, 407, 419

[56] References Cited

U.S. PATENT DOCUMENTS

| | | | |
|---|---|---|---|
| 3,761,311 | 9/1973 | Perrington et al. | 117/239 |
| 4,225,449 | 9/1980 | Papay et al. | 252/46.6 |
| 4,277,301 | 7/1981 | McIntyre et al. | 156/446 |
| 4,547,393 | 10/1985 | Asai et al. | 427/48 |
| 4,746,542 | 5/1988 | Chino et al. | 427/131 |
| 4,854,262 | 8/1989 | Chino et al. | 118/411 |
| 4,863,793 | 9/1989 | Ogawa et al. | 428/323 |
| 4,870,920 | 10/1989 | Kageyama et al. | 118/103 |
| 4,907,530 | 3/1990 | Shibata et al. | 118/410 |
| 4,963,433 | 10/1990 | Ogawa et al. | 428/323 |
| 4,965,125 | 10/1990 | Masaki et al. | 428/329 |
| 4,968,528 | 11/1990 | Tanaka et al. | 427/131 |
| 4,995,339 | 2/1991 | Tobisawa et al. | 118/410 |
| 5,030,484 | 7/1991 | Chino et al. | 427/434.3 |
| 5,069,934 | 12/1991 | Chino et al. | 427/131 |
| 5,072,688 | 12/1991 | Chino et al. | 118/411 |
| 5,083,524 | 1/1992 | Hiraki et al. | 118/407 |
| 5,097,792 | 3/1992 | Umemura et al. | 118/314 |
| 5,108,787 | 4/1992 | Hiraki et al. | 427/128 |
| 5,118,525 | 6/1992 | Chino et al. | 427/44 |
| 5,376,178 | 12/1994 | Sato | 118/411 |

FOREIGN PATENT DOCUMENTS

| 0 452 959 | 10/1991 | European Pat. Off. . |
|---|---|---|
| 0 461 933 | 12/1991 | European Pat. Off. . |

OTHER PUBLICATIONS

Japanese abstract 50–22835.
Japanese abstract 54008646.
Japanese patent 60–57387.
*The Complete Handbook of Magnetic Recording*, Jorgenson, pp. 195–199.
*Lubrication Journal*, H. Block, Dec. 1953, "The Foil Bearing–A New Departure in Hydrodynamic Lubrication", pp. 316–320.

*Primary Examiner*—Laura Edwards
*Attorney, Agent, or Firm*—William D. Bauer

[57] ABSTRACT

Method and apparatus of coating a plurality of wet layers on an flexible elongated web, which is economical to build and easy to operate at high speeds, and an apparatus which can be used to manufacture multi-layer magnetic recording media of the highest quality. Such apparatus can employ a gravure coater while an extrusion die both smoothes the wet gravure layer to eliminate its pattern and simultaneously extrudes a second dispersion. That smoothing is provided by a face of the upstream lip, which face has a convex shape that allows the wet gravure layer to remain in contact with the upstream lip over a wrap angle $\gamma$ of at least two degrees, thus ensuring that the tensioned carrier web neither buckles in the cross-web direction nor experiences instabilities such as fluttering. The extruded layer is contacted by a smooth face of the downstream lip, and the coated carrier web exits the smooth face substantially tangentially at a sharp trailing corner.

46 Claims, 8 Drawing Sheets

6,033,723

METHOD AND APPARATUS FOR COATING PLURALITY OF WET LAYERS ON FLEXIBLE ELONGATED WEB

FIELD OF THE INVENTION

The invention primarily concerns methods and apparatus for coating a plurality of wet layers on a flexible elongated web and for the manufacture of multi-layer magnetic recording media.

DESCRIPTION OF THE RELATED ART

Magnetic recording media can be manufactured as illustrated in U.S. Pat. No. 3,761,311, Perrington et al., FIG. 1 of which shows "a tank 10 which is continuously supplied with a dispersion" of magnetizable particles and binder. This is picked up in the fine grooves of a gravure roll 12 which is scraped by a doctor blade 13 so that substantially the only material left is that contained in the grooves. The dispersion is pressed by a rubber roll 14 into contact with and transferred to an uncoated backing member 15 which is moving at the same speed and in the same direction as the gravure roll 12, as indicated by the arrow 16. Before significant evaporation of the volatile vehicle, the knurl pattern of the coating is smoothed out by a flexible blade 17. The coated backing member then passes between a pair of bar magnets 18 to physically align the magnetizable particles and on to a heated oven 19 to dry the coating" (col. 4, line 65, through col. 5, line 4).

Instead of a flexible smoothing blade, Japanese Patent Publication No. Shouwa 60[1985]-57387 (assigned to Fuji Film K.K.), which was published Jan. 23, 1979, uses a rigid member such as a "solid body smoother 3" (FIG. 1) to smooth a gravure coating of magnetizable particles. The initial contact face of the rigid smoothing member has what a translation calls "curvature coefficient radii . . . in the range of 10R~100R" without further explanation. Another requirement is that the Fuji rigid ember should have "an edge shape" (page 3, line 9, of translation) or "lower edge part angle," (Example 1 that is less than 150 degrees, preferably less than 120 degrees (the latter being shown in FIG. 3). [The present application uses the term "trailing edge" to indicate that portion of a rigid smoothing member which is comparable to "an edge shape" or "lower edge part angle" of the Fuji application.] U.S. Pat. No. 4,870,920, Kageyama et al, also uses a rigid member to smooth a gravure coating. Its smoothing member is formed with grooves 7 that spread the coating laterally.

U.S. Pat. No. 4,746,542, Chino et al, indicates that "dual-layer magnetic coatings" can enhance high-density recording and that additional layers can be applied for other purposes such as for improving the adhesion between the support and the magnetic layer or back layer" (col. 1, lines 17–22). In FIG. 1, a traveling support is drawn across an extruder-type coating head 4 by which a second layer coating solution 5 is applied to a first layer 2 before the first layer has hardened. The first layer can be formed by any of various coating techniques such as by gravure coating. As used in the Chino patent, "dual-layer magnetic coatings" does not mean there is more than one magnetizable coating, because its specification makes clear that the other coating may or may not contain magnetizable particles.

Like the Chino patent, U.S. Pat. No. 4,965,125, Masaki et al, concerns magnetic recording media having at least two coatings. In FIG. 1, a dispersion of magnetizable particles [called "a first coating solution (a) 2"] is applied to a non-magnetic flexible support 1 by means of "a coating apparatus (A) 3" which could be a gravure coater. "Immediately thereafter the coated surface undergoes a smoothing treatment by a smoothing roll 4, and a second coating solution (b) 5 which is provided by an extrusion coating apparatus (B) 6 is coated thereon while first coating solution (a) 2 remains wet" (col. 3, lines 13–18). The second coating solution contains "abrasive agent particles, or abrasive agent particles and lubricating agent particles in a binder" (col. 6, lines 39–41). It is preferred "that the same or the same kinds of binders and solvents are used in the first and second coating solutions" so that the "two layers may be deemed to be one layer magnetically" (col. 6, lines 49–57).

The dual-coating apparatus shown in each of U.S. Pat. No. 4,863,793, Ogawa et al, and U.S. Pat. No. 4,963,433, Ogawa et al, is identical to that shown in the Masaki patent. In each of the Ogawa patents, the first layer contains non-magnetic particles and the second contains ferromagnetic particles.

U.S. Pat. No. 4,968,528, Tanaka et al, FIG. 2 of which is substantially identical to FIG. 1 of each of the Masaki and both Ogawa patents, states that a "magnetic coating solution" can be applied at higher speeds by an extrusion coating apparatus when it is applied over a wet coating of "a solvent having the same composition as that used in the magnetic coating solution or one that is compatible therewith" (col. 2, lines 13–18). The wet coating also protects the flexible carrier web.

Although none of the Masaki, Ogawa, or Tanaka patents say anything about the design of its extrusion coating head, European Patent Application. Publication No. 0 452 959 A2, Shibata et al, describes the construction of various extruder-type heads. The upstream lip of head 1 of FIG. 1 is called "a back edge portion 4", and the downstream lip is called "a doctor edge portion 5". The back edge portion 4 has a radius of curvature R, of 0.5 to 10 millimeters and "the relief angle θ of the web to the tangent $S_1$ on the surface of the back edge portion 4 at the point of the incoming web to the surface is 0 to 15°" (p. 4, lines 54–55). The doctor edge portion 5 has a radius of curvature $R_7$. In Example 1, "the radius $R_1$ of curvature of the carrier-facing surface of the back edge portion of the head 1, the length of the surface along the conveyance direction, the radius $R_7$ of curvature of the corner-facing surface . . . and the length of the latter surface along the conveyance direction were 1.0 millimeter, 0.4 millimeters, 5.0 millimeters and 2.5 millimeters, respectively" (p. 7, lines 45–47). "(A)ny extraneous substance or the like which is clinging to the carrier surface is scraped off by the upstream edge of the back edge portion's surface" (p. 6, lines 35–36). FIG. 2 of the Shibata patent publication shows an extruder-type coating head which has two slots 15 and 16 by which two different coatings of magnetizable particles are simultaneously applied to a carrier web.

U.S. Pat. No. 4,854,262, Chino et al, and U.S. Pat. No. 5,030,484, Chino et al, show several extrusion-type heads for simultaneously applying two layers of dispersions of particles, both of which may be magnetizable. FIGS. 1–4 of Chino '262 show an extrusion die which has two extrusion slots and first and second doctor edges 5 and 6 having convex faces of radii $R_1$ and $R_2$. Dispersions are said to be "simultaneously applied to the support W without an increase of shearing stress and without defects" (col. 5, lines 48–50).

Even though a number of the above-discussed references show apparatus for the manufacture of multi-layer magnetic recording media, and some of them show the extrusion of one or more layers of dispersions onto a wet gravure coating, none teaches how to smooth a gravure coating before extruding the additional layer or layers, even though some of them show a smoothing device. Using a rigid smoothing member, such as those shown in the Fuji Japanese Patent publication and the Kageyama patent, would require the coating apparatus to include three pieces of equipment, namely, a gravure coater, a smoothing member and an extrusion-type coater.

SUMMARY OF THE INVENTION

The invention provides a novel method and apparatus for coating a plurality of wet layers on a flexible elongated web and for the manufacture of multi-layer magnetic recording media, which apparatus, in at least one embodiment, includes a gravure coater but requires only two pieces of equipment and, hence, is more economical to build and easy to operate as compared to a 3-piece apparatus such as that previously mentioned. Here, the term "multi-layer" indicates at least two consecutive layers of particles and binder. In one embodiment and like the above-cited Chino Pat. No. 4,746,542, each of the layers can contain any of various particles used in magnetizable and nonmagnetizable layers of magnetic recording media such as abrasive particles, lubricating particles, and/or magnetizable particles. For example, the gravure coater can apply a magnetizable layer of low coercivity ($H_c$), and the extrusion head can apply a relatively thin magnetizable layer of higher coercivity. For a second example, an outer layer of magnetizable particles and binder can be applied over a wet dispersion of abrasive particles and binder, which abrasive particles are sufficiently large to protrude through the outer layer and so function as a head-cleaning agent. For a third example, a resin-starved outer layer of nonmagnetizable particles and binder can be applied over a wet dispersion of electrically conductive particles and binder to provide a nonmagnetizable backside coating that is sufficiently porous to prevent an air bearing from forming during high-speed winding, e.g., in duplicating operations. Other useful materials which can be employed in one or more layers of magnetic recording media produced by the novel method and apparatus include nonmagnetizable pigments, lubricants, and cross-linking agents.

Not only are the novel method and apparatus economical and easy to operate, but they permit the manufacture of multiple wet layers on a flexible elongated web and, in one embodiment, of multi-layer magnetic recording media to take advantage of the high speeds permitted in gravure coating. Furthermore, the novel method and apparatus afford coated flexible elongated web and, in one embodiment, multi-layer magnetic recording media of the highest quality, each layer being of uniform thickness and virtually free from defects such as pinholes and streaks.

In one embodiment, the present invention is an apparatus for coating a plurality of wet layers on a flexible elongated web. An advancing means longitudinally advances the flexible elongated web in a longitudinal direction. A coating means applies a first wet layer onto one face of the flexible elongated web. A pair of spaced guides contacts the opposite face of the flexible elongated web downstream of the coating means. Tension means applies tension to the flexible elongated web between the pair of spaced guides. An extrusion die applies a second wet layer, the extrusion die having an upstream lip and a downstream lip, each having a side, which sides together define an extrusion slot. The upstream lip is formed with a face which is substantially straight in a crossweb direction substantially orthogonal to the longitudinal direction, which intersects the side of the upstream lip to form a trailing edge, and at least of a portion of which is generally convex with respect to the flexible elongated web generally having a radius of curvature no greater than 200 millimeters. The downstream lip is formed with a face which is substantially straight in the crossweb direction, which intersects the side of the downstream lip to form a leading edge which is further from the flexible elongated web than a line drawn tangent to the face of the upstream lip at the trailing edge, which is generally convex from its leading edge at least to an arcuate apex, and which, at the arcuate apex, has a radius of curvature which is from 0.2 to 2.0 times the radius of curvature of the face of the upstream lip, which arcuate apex approximately extends to the above-mentioned line. A support means supports the extrusion die such that between the spaced guides the first wet layer contacts a portion of the face of the upstream lip.

In another embodiment, the present invention is an apparatus for manufacturing a multi-layer magnetic recording medium having a plurality of coated layers on a flexible elongated carrier web. An advancing means longitudinally advances the flexible elongated carrier web in a longitudinal direction. A coating means applies a wet layer of a dispersion of particles and binder onto one face of the flexible elongated carrier web. A pair of spaced guides contact the opposite face of the flexible elongated carrier web downstream of the coating means. Tension means applies tension to the flexible elongated carrier web between the pair of spaced guides. An extrusion die has an upstream lip and a downstream lip, each having a side, which sides together define an extrusion slot. The upstream lip is formed with a face which is substantially straight in a crossweb direction substantially orthogonal to the longitudinal direction, which intersects the side of the upstream lip to form a trailing edge, and which, along a line parallel to and at least 0.5 millimeter distant from the trailing edge, has a radius of curvature no greater than 200 millimeters. The downstream lip is formed with a face which is substantially straight in the crossweb direction, which intersects the side of the downstream lip to form a leading edge which is further from the flexible elongated web than a line drawn tangent to the face of the upstream lip at the trailing edge, which is convex from its leading edge at least to an arcuate apex, and which, at the arcuate apex, has a radius of curvature which is from 0.2 to 2.0 times the radius of curvature of the face of the upstream lip, which arcuate apex approximately extends to the above-mentioned line. A support means supports the extrusion die such that between the spaced guides, the wet layer can initially contact the face of the upstream lip and remains in contact with the face of the upstream lip over a wrap angle $\gamma$ of at least two degrees.

It is preferred that the tension means applies tension to an unsupported span of the flexible elongated carrier web.

It is preferred that the apparatus further has a means supporting the extrusion die such that, at the unsupported span, the first wet layer contacts the face of the upstream lip forming a radius of curvature of the unsupported span of no greater than 50 millimeters and remains in contact with the face of the upstream lip over a wrap angle of $\gamma$ of at least two degrees and wherein the flexible, elongated web stops contacting the face of the downstream lip approximately tangentially at its trailing corner.

It is preferred that the face of the upstream lip is smooth and convex. In one embodiment, it is preferred that the face of the upstream lip extends at least 1 millimeter over an angle $\beta$ of at least 8 degrees in the longitudinal direction. It is preferred that the face of the downstream lip is smooth. It is preferred that the trailing edge of the downstream lip terminates at a trailing corner which is not greater than 120 degrees.

In another embodiment, the present invention provides an apparatus for manufacturing a multi-layer magnetic recording medium. An application means applies a wet gravure layer of a dispersion of particles and binder onto one face of a flexible elongated carrier web that is being advanced longitudinally. A pair of spaced guides contacts the opposite face of the web downstream of the coating means. Tension means applies tension to the web across an unsupported span between the spaced guides. An extrusion die includes upstream and downstream lips, each having a side, which sides together define an extrusion slot. The upstream lip is formed with a smooth, convex face which is substantially straight in the crossweb direction of the web, extends at least 1 millimeter over an angle β of at least 8° in the longitudinal direction of the web and intersects the side of the upstream lip to form a trailing edge, and along a line parallel to and at least 0.5 millimeters distant from the trailing edge, has a radius of curvature no greater than 50 millimeters. The downstream lip is formed with a smooth face which is substantially straight in the crossweb direction of the web, intersects the side of the downstream lip to form a leading edge which cannot be contacted by the gravure layer, is convex from its leading edge at least to an arcuate apex and, at the apex, has a radius of curvature which is from 0.2 to 2.0 times the radius of curvature of the convex face of the upstream lip at its trailing edge, which apex approximately extends to a line tangent to the convex face of the upstream lip at its trailing edge, and terminates at a trailing corner which is not greater than 120 degrees. The wet gravure layer can initially contact the convex face of the upstream lip where its radius of curvature is no greater than 50 millimeters and remain in contact with the convex face over a wrap angle y of at least two degrees and the web can leave the smooth face of the downstream lip approximately tangentially at its trailing corner.

In another embodiment, the present invention is a method of coating a plurality of wet layers on a flexible elongated web. The flexible elongated web is advanced in a longitudinal direction. A first wet layer is applied onto one face of the flexible elongated web. Tension is applied to the flexible elongated web between a pair of spaced guides contacted by the opposite face of the flexible elongated web downstream of the application of the first wet layer. A second wet layer is applied with an extrusion die, the extrusion die having an upstream lip and a downstream lip, each having a side, which sides together define an extrusion slot. The upstream lip is formed with a face which is substantially straight in a crossweb direction substantially orthogonal to the longitudinal direction, which intersects the side of the upstream lip to form a trailing edge, and at least of portion of which is generally convex with respect to the flexible elongated web generally having a radius of curvature no greater than 200 millimeters. The downstream lip is formed with a face which is substantially straight in the crossweb direction, which intersects the side of the downstream lip to form a leading edge which is further from the flexible elongated web than a line drawn tangent to the face of the upstream lip at the trailing edge, which is generally convex from its leading edge at least to an arcuate apex and, which, at the arcuate apex, has a radius of curvature which is from 0.2 to 2.0 times the radius of curvature of the face of the upstream lip, which arcuate apex approximately extends to the above-mentioned line. The extrusion die is supported such that between the spaced guides the first wet layer contacts the portion of the face of the upstream lip.

It is preferred that tension is applied to an unsupported span of the flexible elongated carrier web.

It is preferred that the face of the upstream lip is smooth and convex.

It is preferred that the face of the upstream lip extends at least 1 millimeter over an angle β of at least 8 degrees in the longitudinal direction.

It is preferred that the face of the downstream lip is smooth.

It is preferred that the trailing edge of the downstream lip terminates at a trailing corner which is not greater than 120 degrees.

When shaped and supported as disclosed above, the convex face of the upstream lip effectively smoothes out the knurl pattern of the wet gravure layer.

Preferably, the convex face of the upstream lip, where it is first contacted by the gravure layer, has a radius of curvature R according to the formula $$R = \frac{2h}{K(6\eta V/T)^{2/3}}$$

wherein h is the final wet coating thickness, K is a constant from 0.05 to 0.5, V is the web speed, i is the viscosity of the coating at a shear rate at V/2h, and T is the web tension per unit width.

A similar formula is discussed by Blok et al.: "The Foil Bearing—A New Departure in Hydrodynamic Lubrication", Lubrication Engineering, December 1953, pages 316–320, regarding the lubricating thickness of an air bearing between a moving flexible web and a curved surface.

A rolling bead forms in the gravure layer where it converges with the convex face of the upstream lip. If K of the formula were larger than 0.5, the rolling bead might become so large as to cause part of the wet gravure layer to be skived off by the upstream lip, thus not only changing the thickness of the gravure layer but also producing debris which could become a source of contamination. If K were less than 0.05, the rolling bead might become so small as to create a danger of insufficient smoothing of the gravure pattern. Ideally, K is from 0.1 to 0.25.

In other areas where it is contacted by the gravure layer, the convex face of the upstream lip can have radii of curvature different from R. When the convex face of the upstream lip does not have a uniform radius of curvature, its radii of curvature preferably become progressively larger toward its trailing edge, and R can become quite large in the vicinity of the trailing edge.

The means for supporting the extrusion die can include means for moving the die both pivotally and in directions perpendicular to the free web line between the aforementioned spaced guides in order to force the carrier web out of its normal path and (a) to achieve a desired wrap angle y which substantially extends to the trailing edge of the upstream lip and (b) to achieve the precise attitude of the coated carrier web as it leaves the smooth face of the downstream lip. By instead adjusting the position of each of the spaced guides in the directions of arrows as indicated in FIG. 1 of the drawing, each of those objectives (a) and (b) can be achieved independently. By making these adjustments during the coating operation, an experienced operator can eliminate coating defects.

Initially, the position of the extrusion head should be adjusted so that the carrier web leaves the smooth face of the downstream lip approximately tangentially at its trailing corner. However, the extrusion head may be repositioned during coating operations to eliminate coating defects so that the carrier web no longer leaves the smooth face approximately tangentially.

When manufacturing a magnetic recording medium with the novel apparatus, the gravure layer, upon contacting the extrusion die, acts as a lubricant to facilitate startup and to stabilize the carrier web. As compared to multi-layer products of the above-cited Tanaka patent, Shibata EPO patent publication, Shogo Offenlegungsschrift, and Chino '484 patent, there is no need to provide an additional layer of solvent before the carrier web can be drawn across the extrusion die.

The extrusion die of the novel coating apparatus can have one or more additional downstream lips, each having a side, which sides together define an extrusion slot. Each additional downstream lip should be so positioned that the apex of its smooth face extends approximately to a line tangent to the smooth face of the preceding downstream lip at its trailing corner.

Dispersions of particles and binder used in making a multi-layer magnetic recording medium should be compatible with each other. One way of accomplishing this is to employ identical binders and solvents.

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERRED EMBODIMENTS

Figure 1:
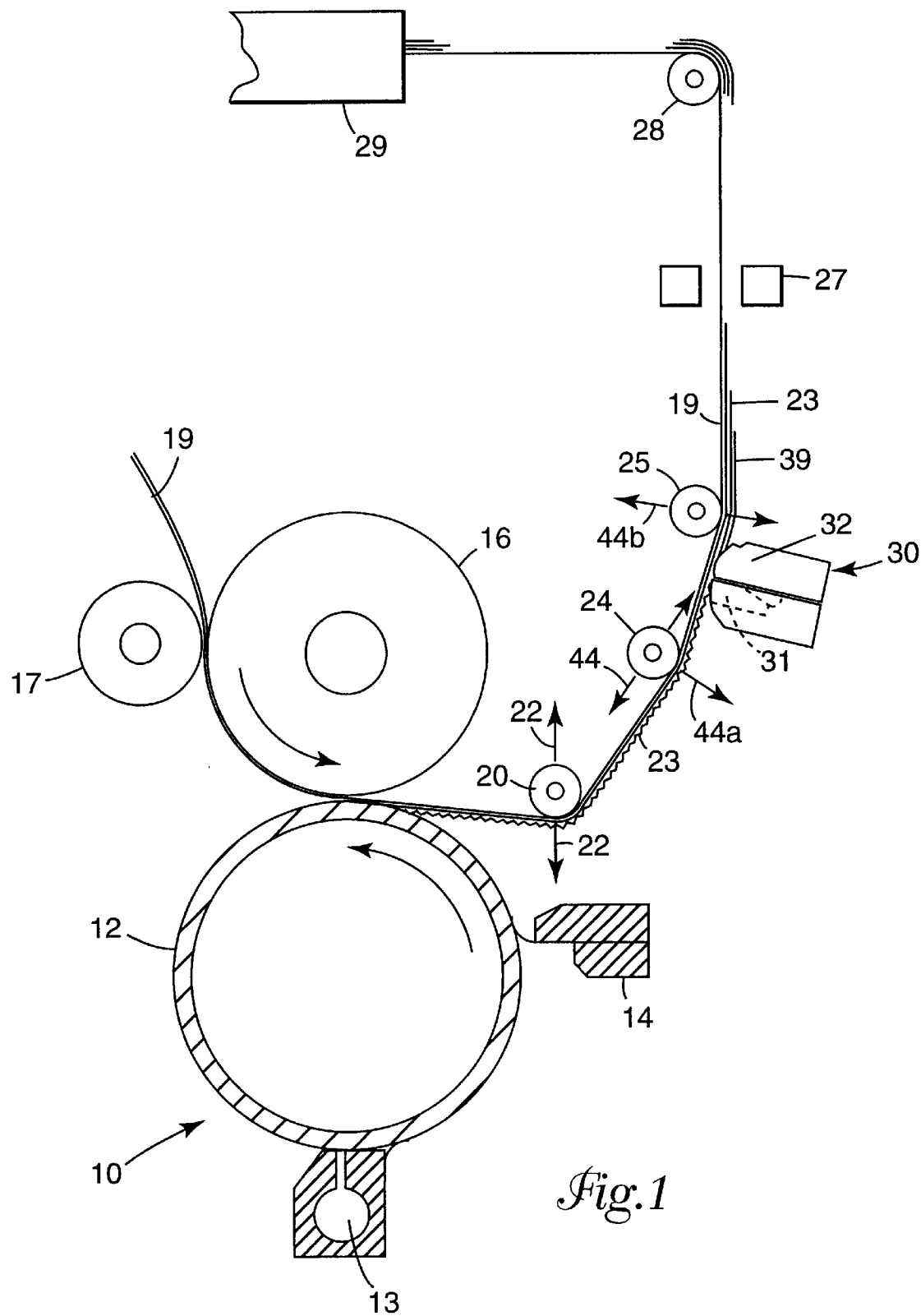
FIG. 1 is an elevation of apparatus of the invention which is being used for continuously applying a gravure layer of a wet dispersion of particles and binder onto one face of a carrier web and for smoothing the wet gravure layer while simultaneously extruding another dispersion of particles and binder onto the gravure layer.

Referring to FIG. 1, a differential-speed gravure coater 10 includes a gravure roll 12, an extrusion-type feed 13, a doctor blade 14, a backup roll 16, and a nip roll 17 which affords tension isolation. An elongated flexible carrier web 19 is fed between the backup and nip rolls and then around a take-up idler roll 20 which is adjustable in the directions of arrows 22 to control the degree of wrap of the carrier web around the gravure roll while a wet gravure layer 23 is being transferred from the grooves of the gravure roll to the web. Both the backup roll and the gravure roll are driven counterclockwise but, after reversing the feed 13 and the position of the doctor blade 14, the gravure roll could be driven clockwise.

From the take-up roll 20, the web 19 crosses an unsupported span between a pair of spaced guides, namely, an upstream idler roll 24 and a downstream idler roll 25, then passes between a pair of bar magnets 27 (which can physically align magnetizable particles of a wet layer or layers) and is overdriven by a pull roll 28, thus creating tension in the web across the span. The carrier web then passes through a heated oven 29.

Figure 2:
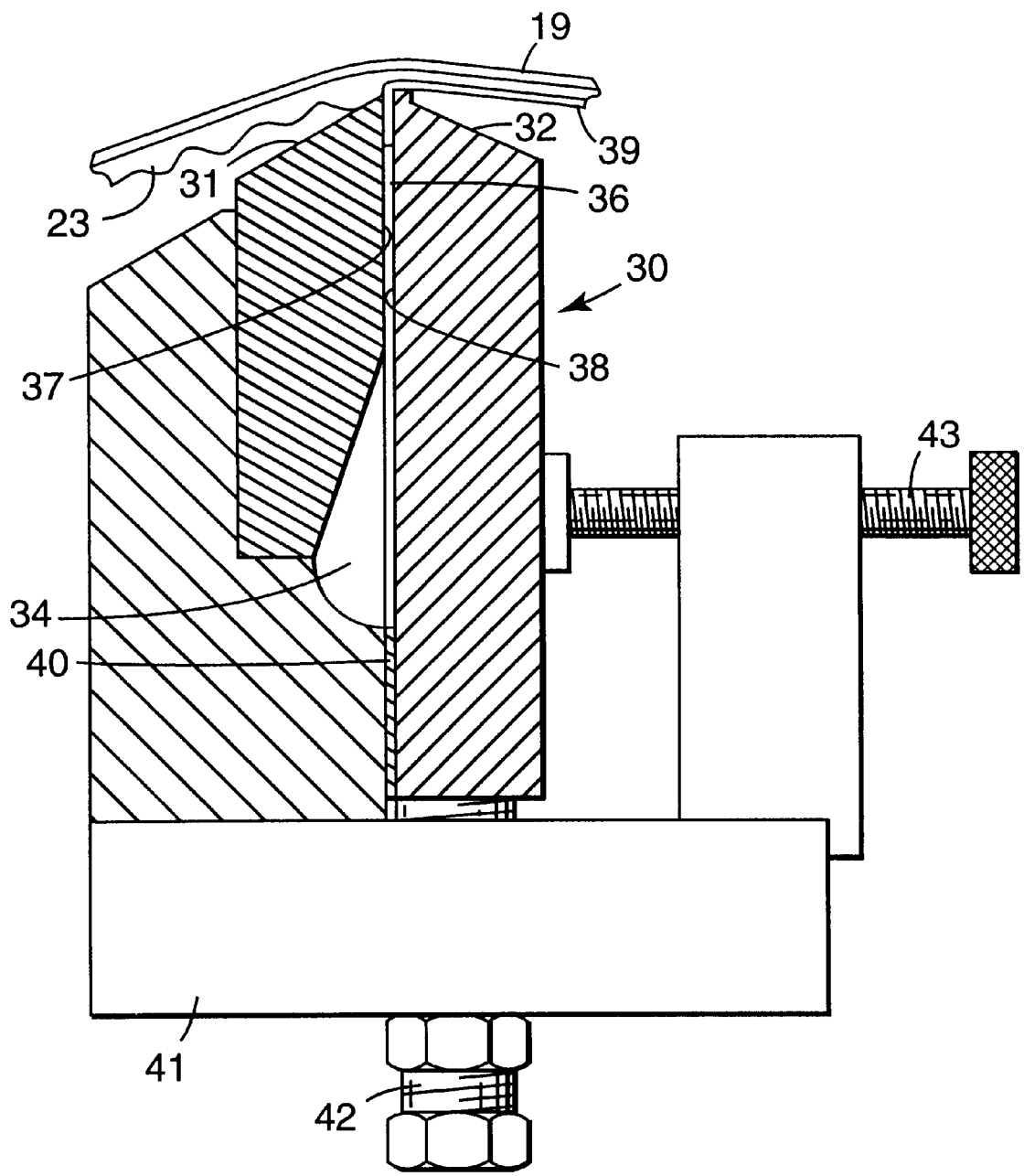
FIG. 2 is a central cross section through the extrusion die of FIG. 1, greatly enlarged.

At the span between the upstream and downstream idler rolls 24 and 25 is an extrusion die 30 which has spaced upstream and downstream lips 31 and 32. A coatable dispersion is fed into a manifold 34 (FIG. 2) which distributes the dispersion through a slot 36 between flat, parallel sides 37 and 38 of the upstream and downstream lips 31 and 32, respectively, thus applying an outer layer 39 over the wet gravure layer 23. The width of the slot can be changed by changing a U-shaped shim 40 which closes the bottom and sides of the slot.

The lips 31 and 32 are supported by a pair of blocks 41 (one at each end of the slot 36). A set screw 42 on each of the blocks 41 permits the position of the downstream lip 32 to be adjusted with respect to that of the fixed upstream lip 31. To permit that adjustment, die-assembly bolts 43 are loosened, bolts 42 are adjusted and bolts 43 are then re-tightened. The position of the upstream idler roll 24 is adjustable in the directions of arrows 44 (FIG. 1) to change the length of the span between the upstream and downstream idler rolls 24 and 25. Also, the position of each of the upstream and downstream idler rolls 24 and 25 is adjustable in directions perpendicular to the free web line between those idler rolls as shown by arrows 44a and 44b, respectively.

Figure 3:
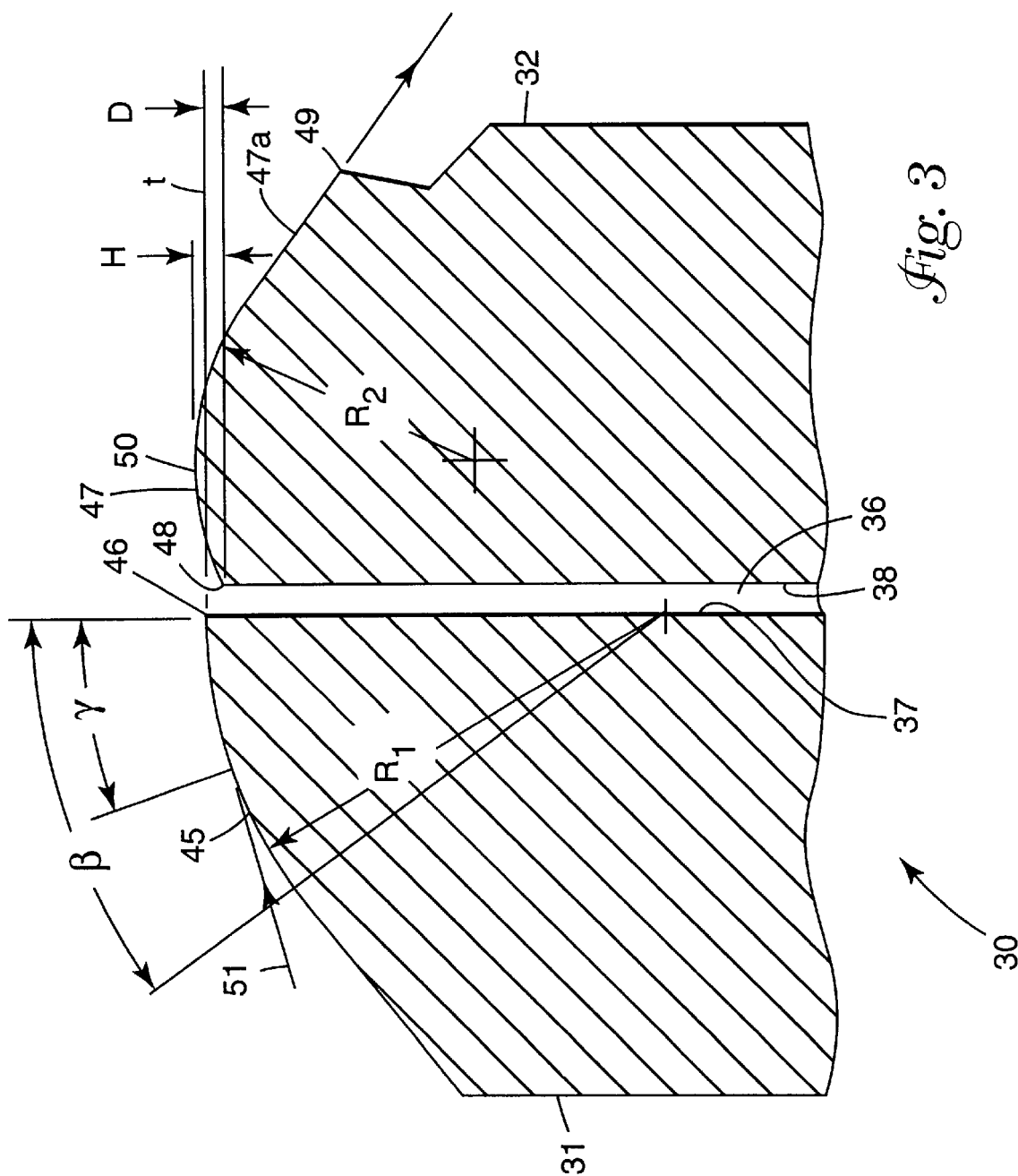
FIG. 3 is a fragmentary cross section like that of FIG. 2, further enlarged and showing the path of a carrier web in relation to the die.

As seen in FIG. 3, the upstream lip 31 is formed with a smooth convex face 45 which has a uniform radius of curvature $R_1$ over an angle $\beta$. The convex face intersects the flat side 37 at a sharp, straight trailing edge 46 which extends in the crossweb direction. The downstream lip 32 is formed with a smooth face 47 which has a convex uniform radius of curvature $R_2$ over an upstream portion of its length. Its convex portion intersects the flat side 38 of the downstream lip 32 to form a straight leading edge 48. Tangential to the convex portion of the smooth face 47 may be a flat portion 47a which terminates at a sharp, straight trailing corner 49 that extends parallel both to the trailing edge 46 of the upstream lip and to the leading edge 48 of the downstream lip 32. The convex portion of the smooth face 47 has an arcuate apex 50 which projects (in a direction perpendicular to a line t tangent to the convex face 45 of the upstream lip at its trailing edge 46) a distance H beyond the leading edge 48 of the downstream lip 32. Also, downstream lip 32 is positioned so that edge 48 is set a distance D below line t drawn tangent to the upstream lip 31 at its trailing edge 46, as shown in FIG. 3. In a preferred embodiment, the magnitude of the distance D is less than the magnitude of the distance H.

In FIG. 3, a fragment of the extrusion die 30 is shown in relation to the path 51 of a carrier web which contacts the convex face 45 of the upstream lip 31 over a wrap angle $\gamma$ that extends substantially to the trailing edge of the upstream lip, passes out of contact with the leading edge 48 of the smooth face 47 of the downstream lip 32, and leaves the smooth face 47 approximately tangentially at its trailing corner 49. The leading edge 48 of the downstream lip 32 is adjustably located a distance D from the tangent line t. When so positioned, the apex 50 approximately extends to the tangent line t and, as shown, preferably extends slightly beyond the tangent line t.

Figure 4:
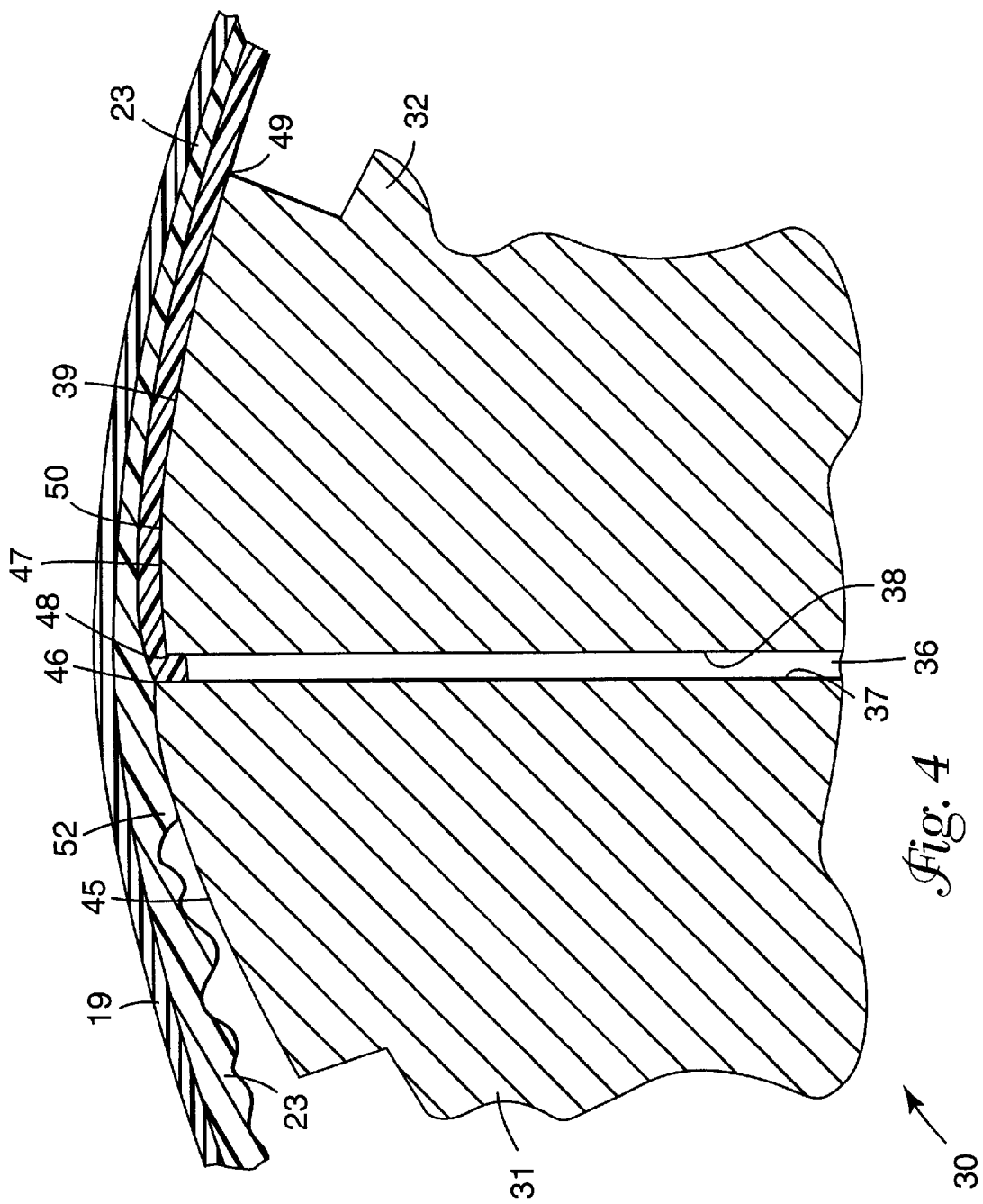
FIG. 4 is a fragmentary cross section like that of FIG. 3 but showing the extrusion of a dispersion of particles and binder onto the wet gravure layer.

In FIG. 4, as the coated carrier web 19 is drawn across the extrusion die 30, a rolling bead 52 forms in the wet gravure layer where it converges with the convex face 45 of the upstream lip, and the knurl pattern of the gravure layer is smoothed out by the convex face. Simultaneously, a coatable dispersion is being forced through the slot 36 to apply the outer layer 39 which is drawn across the smooth face 47 of the downstream lip 32 and leaves the smooth face approximately tangentially at its trailing corner 49.

Figure 5:
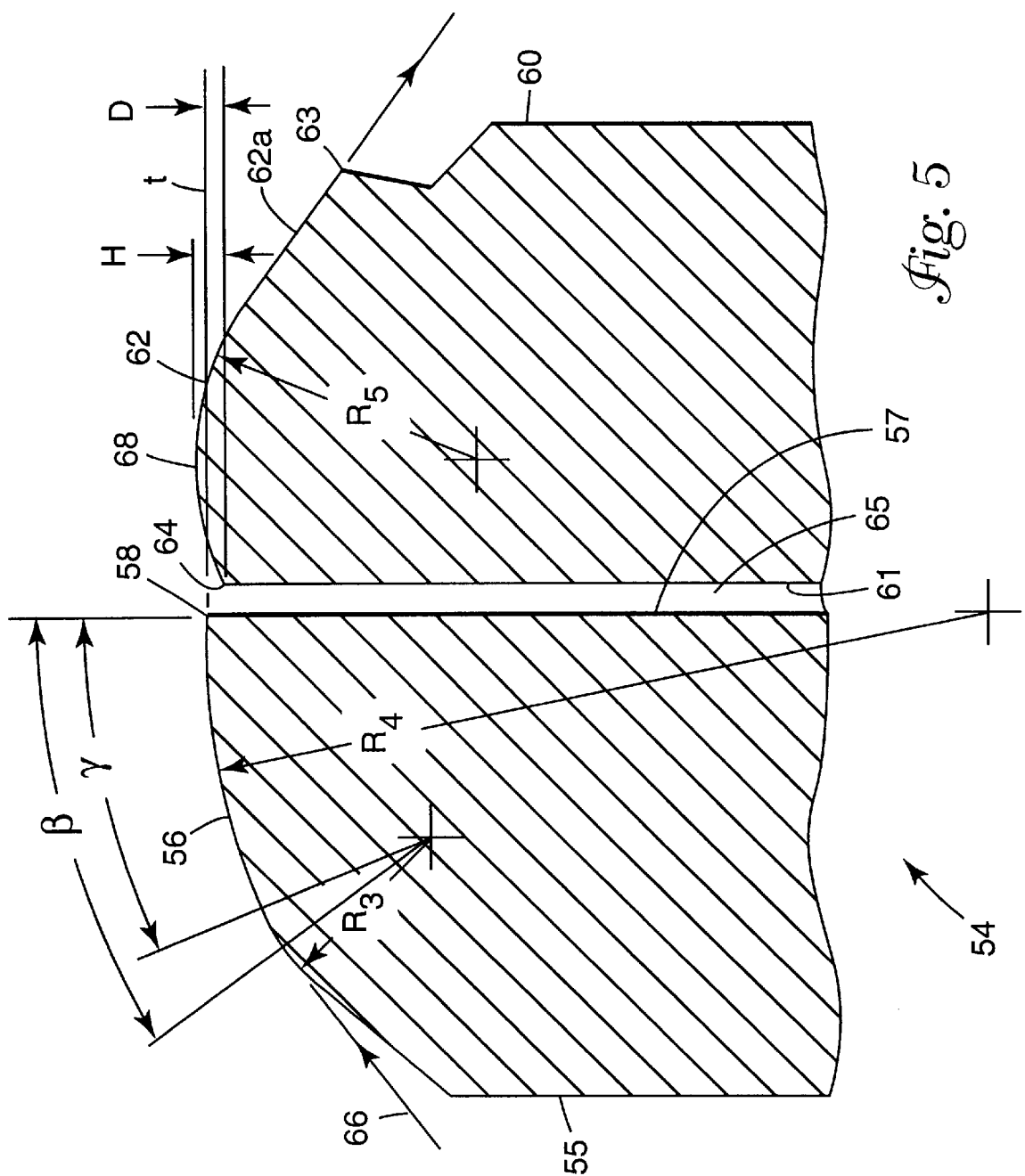
FIG. 5 is a cross section like that of FIG. 3 except through a fragment of a second extrusion die which is useful in the invention, the die being shown in relation to the path of a carrier web.

In FIG. 5, a second extrusion die 54 has an upstream lip 55 which is formed with a smooth convex face 56 that has tangential radii of curvature, $R_3$ and $R_4$, together extending over an angle $\beta$. The convex face 56 intersects a flat side 57 at a sharp, straight trailing edge 58 which extends in the crossweb direction. The downstream lip 60 of the second extrusion die 54 is formed with a flat side 61, a smooth face 62, and a trailing corner 63. The smooth face 62 has a convex uniform radius of curvature $R_5$ from its leading edge 64 to midway toward its trailing corner 63 and may have a tangential flat portion 62a which terminates at the trailing corner 63. The flat sides 57 and 61 define an extrusion slot 65.

In FIG. 5, the extrusion die 54 is shown in relation to the path 66 of a carrier web. The path 66 contacts the convex face 56 of the upstream lip 55 over a wrap angle $\gamma$, passes out of contact with the leading edge 64 of the downstream lip 60, across an arcuate apex 68 of the smooth face 62, and leaves the smooth face 62 approximately tangentially at its trailing corner 63. In FIG. 5, H and D have the same meaning as in FIG. 3.

Figure 6:
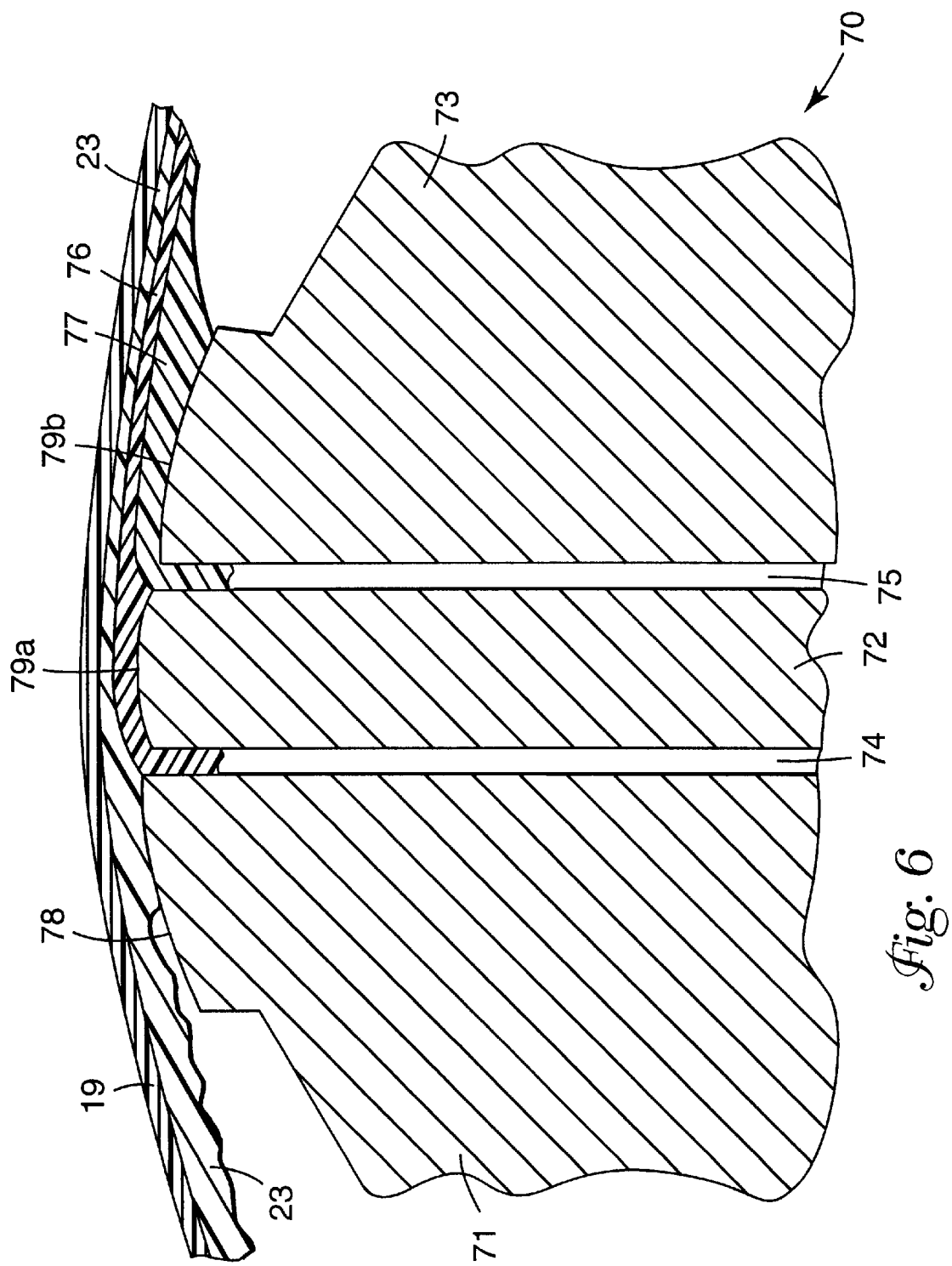
FIGS. 6 and 7 are cross sections like those of FIGS. 3 and 5 except through fragments of extrusion dies being used to apply second and third layers of dispersions of particles and binder over a wet gravure layer in accordance with the invention.

FIG. 6 shows a third extrusion-type extrusion die 70 which has spaced upstream, intermediate, and downstream lips 71, 72 and 73, respectively. Between the upstream and intermediate lips 71 and 72 is a slot 74, and between the intermediate and downstream lips 72 and 73 is a slot 75 which, as shown, is parallel to the slot 74, even though it may be preferable for the two slots to be slanted toward each other at a shallow angle. Each slot can carry a coatable dispersion, thus applying an intermediate layer 76 and an outer layer 77 over a wet gravure layer 23. The upstream lip 71 is formed with a convex face 78 which can be identical to the convex face 45 of the upstream lip 31 of FIGS. 1–4. The intermediate lip 72 is formed with a smooth face 79a which has a uniform radius of curvature and preferably is relatively short in length, e.g., 3–5 millimeters. The smooth face 79b of the downstream lip 73 preferably has a greater length and has convex and flat portions similar to the smooth face 47 of the downstream lip 32 of FIGS. 1–4.

Figure 7:
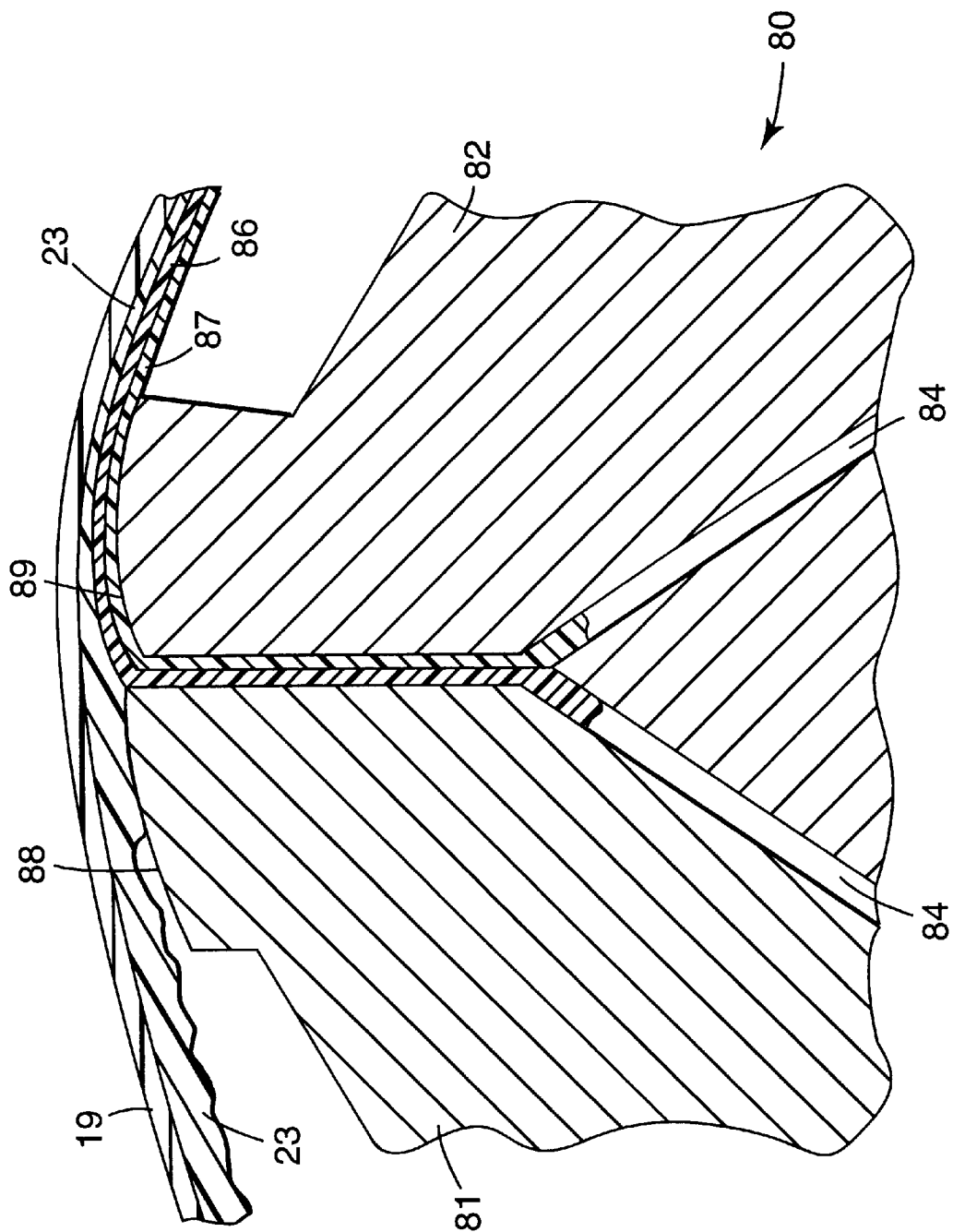

FIG. 7 shows a fourth extrusion-type extrusion die 81 which has spaced upstream and downstream lips 81 and 82, respectively. Between the lips 81 and 82 is a Y-shaped slot 84 into which two coatable dispersions are fed from separate manifolds (not shown), thus applying an intermediate layer 86 and an outer layer 87 over a wet gravure layer 23. Each of the upstream and downstream lips 81 and 82 is formed with a smooth face 88 and 89, respectively, which can be identical to the convex face 45 and smooth face 47, respectively, of the upstream and downstream lips 31 and 32, respectively, of FIGS. 1–4.

Figure 8:
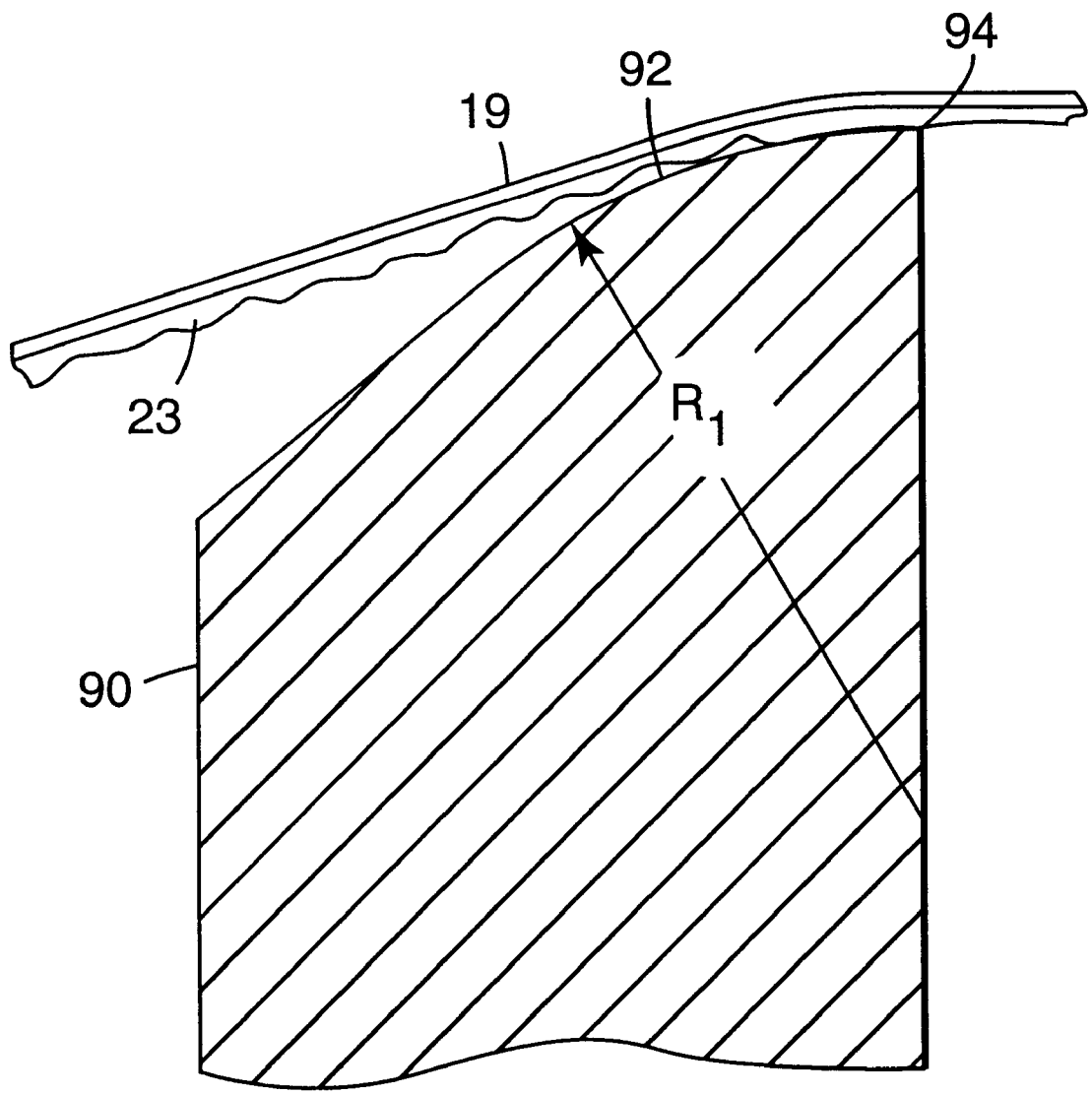
FIG. 8 is a fragmentary cross section through a smoothing member of novel apparatus of the invention for smoothing a wet gravure layer of a single-layer magnetic recording medium.

In FIG. 8, a rigid smoothing member 90 can be substituted for the extrusion die 30 of FIGS. 1–4 to use the apparatus in the manufacture of a single-layer magnetic recording medium. The rigid smoothing member 90 is formed with a smooth convex face 92 which can be identical to the convex face 45 of the upstream lip 31 of the extrusion die of FIGS. 1–4 and accordingly has a sharp, straight trailing edge 94 that extends in the crossweb direction. The convex face 92 effectively smoothes the knurl pattern of the gravure layer 23 on the carrier web 19.

The convex face of the upstream lip of an extrusion die which is useful in the invention preferably extends over an angle $\beta$ of at least 8 degrees in the longitudinal direction of the web to allow adequate space for a rolling bead of the wet gravure layer and to permit the wrap angle $\gamma$ to be at leasttwo degrees, thus ensuring that the carrier web neither buckles in the cross-web direction nor experiences instabilities such as fluttering. If the angle $\beta$ were substantially greater than 30 degrees, it may be difficult to form an upstream lip with a radius less than 50 millimeters of adequate structural integrity. Preferably, the wrap angle $\gamma$ is from 5 degrees to 20 degrees.

Preferably, the arcuate length of the convex face of the upstream lip is from 1 to 20 millimeters to allow from 0.5 to 15 millimeters of contact with the wet gravure layer. A contact length substantially less than 0.5 millimeters would create a danger of insufficient smoothing of the gravure pattern, whereas a contact length substantially greater than 15 millimeters might result in instability in the carrier web, thus possibly causing down-web striations and/or cross-web chatter. More preferably, the extrusion 5 head is positioned relative to the gravure layer to allow from 1 to 10 millimeters of contact between the wet gravure layer and the convex face of the upstream lip.

When a rigid smoothing member, which is not built into an extrusion die, is used for smoothing a gravure layer (e.g., for smoothing a gravure layer which is to serve as the only magnetizable layer of a magnetic recording medium), it should have a smooth convex face which is constructed to have the above-discussed preferences for the convex face of an upstream lip.

Preferably, the radius of curvature of the smooth face of the downstream lip of the extrusion die at its arcuate apex is from 0.2 to 2.0 times the radius of curvature of the convex face of the upstream lip adjacent its trailing edge. Outside of this preferred range, there would be a danger that this would result in nonuniformity in the layers being coated onto the carrier web. Still more preferably, the radius of curvature of the smooth face of the downstream lip of the extrusion die at its arcuate apex is from 0.4 to 1.0 times the radius of curvature of the convex face of the upstream lip adjacent its trailing edge. The smooth face of the downstream lip can have a uniform radius of curvature over its full length. When its radius of curvature is nonuniform, it preferably becomes progressively larger toward its trailing corner. Because a flat surface is easier to fabricate than a curved surface, the cost of a downstream lip may be reduced by making the smooth face flat in the vicinity of the trailing corner as in FIGS. 3 and 4.

Except for the aforementioned relationship between the radii of curvature of the downstream lip at its leading edge and the upstream lip at its trailing edge, each of the convex face of the upstream lip and the smooth face of the downstream lip is of independent design, and either lip can have a uniform radius of curvature when the other does not.

For greater assurance of freedom from coating defects, the convex region of the smooth face of the downstream lip preferably extends over at least 2 degrees of arc downstream of the center of the arcuate apex, more preferably at least 5 degrees.

Preferably, the trailing edge of the upstream lip and both the leading edge and the trailing corner of the downstream lip should be (a) sharp, to ensure against streaks and other marks in the smoothed layer, (b) smooth, i.e., free from burrs or other artifacts that would introduce defects into the coatings, and (c) straight and parallel to each other.

To minimize any danger of streaks and striations, the trailing corner of the downstream lip preferably is not greater than 120 degrees.

In one embodiment, the distance H (indicated in FIGS. 3 and 5) preferably should be from 0.01 to 0.3 millimeters, still more preferably from 0.02 to 0.1 millimeters. The distance D preferably should initially be set to be from 0 to 0.3 millimeters, still more preferably from 0.02 to 0.1 millimeters. However, adjustments made during coating operations to eliminate coating defects may take the distance D outside of this preferred range. Typically after such adjustments, the arcuate apex of the smooth face of the downstream lip is positioned from 0.03 to 0.06 millimeters beyond a line t tangent to the convex face of the upstream lip at its trailing edge so that the tangent line t intersects the smooth face of the downstream lip.

In another embodiment, the magnitude of the distance H is preferably greater than the magnitude of the distance D, where the magnitude of the distance D is greater than zero.

It should be recognized, however, that if the top layer being coated were very thick, H could be, or optionally, should be smaller than D.

The unsupported span between the spaced guides preferably is adjustable to be from 2 to 30 centimeters in length, if the span were substantially greater than that range, the carrier web might buckle longitudinally, especially when it is thin, i. e., less than 1 mil (25 $\mu$m) in thickness. If the span were substantially less than that range, the degree to which the extrusion head deflects the carrier web would be difficult to control. Preferably, the span is from 4 to 10 centimeters in length.

EXAMPLE 1

Apparatus as shown in FIGS. 1–4 was employed to make a magnetic recording medium. The flexible carrier web was biaxially oriented poly(ethyleneterephthalate) film having a thickness of 0.26 mil (6.6 $\mu$m) and a width of 12.5 inches (31.8 centimeters). Continuously supplied to the gravure roll was a dispersion of acicular $\gamma$-Fe$_2$O$_3$ Particles while the carrier web was advanced at a speed of 1200 ft/min (365 m/min). The coating apparatus included a steel doctor blade 14 for scraping dispersion from the lands of the gravure roll. The span between the idler rolls 24 and 25 was 6.5 inches (16.5 centimeters) and the distance between the upstream idler roll 24 and the slot 36 of the extrusion die 30 was 4.5 inches (12.5 centimeters). The carrier web 19 was under a tension of about 30 lb$_f$ (133 N) between the idler rolls.

The convex face of the upstream lip of the die (which was stainless steel) had a uniform radius of curvature $R_1$, of 0.25 inch (6.35 millimeters) over an angle m of 30° and a sharp, straight trailing edge of 90°. The smooth face 47 of the downstream lip had a radius of curvature $R_2$ of 0.25 inch (6.35 millimeters) over an arcuate length of 75 mils (1.9 millimeters), a flat portion 47a having a length of 50 mils (1.3 millimeters), and a sharp, straight trailing corner 49 of 90°. The arcuate apex 50 of the downstream lip 32 projected a distance H of 1.8 mils (46 $\mu$m) beyond the leading edge 48, and the downstream lip was adjusted with respect to the upstream lip so that the leading edge 48 was spaced a distance D of 2.1 mils (53 $\mu$m) below the tangent line t. The gravure layer on the carrier web contacted the convex face the upstream lip over a wrap angle $\gamma$ of about 15° and left the smooth face the downstream lip approximately tangentially at its trailing corner 49.

Continuously extruded through the slot 36 was a dispersion of barium ferrite platelets in a solution of polyurethane binder in methylethylketone/cyclohexanone/toluene (60/30/10) having a solids content of 36% by weight and a viscosity of 20 cps at 10000 sec$^{-1}$ shear rate. After being magnetically oriented and dried, the inner layer of the resulting magnetic recording medium had a uniform dry thickness of 0.075 mil (1.875 $\mu$m), and the outer layer had a uniform dry thickness of 0.015 mil (0.375 $\mu$m). The resulting two layers of magnetizable particles showed no evidence of a gravure pattern when examined microscopically, both in reflective and transmissive modes, and when examined by interferometry. The outer magnetizable layer had excellent surface smoothness when examined under a laser interferometer. Examination by transmission electron microscopy revealed excellent interlayer definition.

EXAMPLE 2

A magnetic recording medium has been made in the same manner as in Example 1 except as follows:

1. The flexible carrier web was biaxially oriented poly (ethyleneterephthalate) film having a thickness of 2.5 mils (63.5 $\mu$m).
2. The gravure dispersion employed nonmagnetic acicular (cc-Fe$_2$O$_3$ particles having a solids content of 26 percent by weight.
3. The dispersion of the extruded layer employed magnetizable acicular fine-metal (iron) particles having a solids content of 27 percent by weight and a viscosity of 10 cps at 10000 sec$^{-1}$ shear rate.
4. The carrier web was under a tension of about 22 lb$_f$ (98 N) between the idler rolls.
5. The upstream lip 55, has two radii of curvature [$R_3$= 0.375 inch (0.95 centimeters) and $R_4$=0.625 inch (1.59 centimeters)], together extending over an angle of 30 degrees.
6. The downstream lip 60 [$R_5$=0.25 inch (0.64 centimeters) extends over an arcuate length of 0.066 inch (1.78 centimeters) and a trailing flat portion 0.434 inch (1.1 centimeters) in length. The downstream lip had a distance H of 1.0 mil (25 $\mu$m) and was adjusted with respect to the upstream lip to afford a distance D of 0.5 mil (12.5 $\mu$m).
7. The gravure layer on the carrier web contacted the convex face of the upstream lip over a wrap angle $\gamma$ of about 18 degrees.
8. The smooth face of the downstream lip was positioned with respect to the upstream lip so that its leading edge was spaced a distance D of 0.5 mil (12 $\mu$m) from the tangent line t.

After being magnetically oriented and dried, the inner layer of the resulting magnetic recording medium had a uniform dry thickness of 0.075 mil (1.875 $\mu$m), and the outer layer had a uniform dry thickness of 0.016 mil (0.4 $\mu$m). Both layers were substantially free from defects when examined under a microscope. The resulting layers showed no evidence of a gravure pattern when examined microscopically, both in reflective and transmissive modes, and when examined by interferometry. When examined under a laser interferometer, the outer magnetizable layer had good surface smoothness, not quite as smooth as the outer magnetizable layer of Example 1. Examination by transmission electron microscopy revealed excellent interlayer definition.

EXAMPLE 3

Apparatus as shown in FIGS. 1–4 was employed to make a single-layer magnetic recording medium except that the extrusion head was replaced by a metal smoothing member which was formed with a smooth convex face that had a uniform radius of curvature of 0.25 inch (0.64 centimeters) over an angle β of 30 degrees, an arcuate length of 0.13 inch (3.3 millimeters), and a sharp, straight trailing edge of 90 degrees.

The flexible carrier web, biaxially oriented poly (ethyleneterephthalate) film, had a thickness of 0.56 mil (14 μm) and a width of 12.5 inches (31.8 centimeters) and was advanced at a speed of 1200 ft/min (365 m/min). Continuously supplied to the gravure roll was a dispersion of acicular γ-$Fe_2O_3$ particles similar to that of Example 1. The metal smoothing member was positioned so that the gravure layer on the carrier web contacted the convex face over a wrap angle γ of about 20 degrees and left the convex face approximately tangentially at its trailing edge. After being magnetically oriented and dried, the magnetizable layer of the resulting magnetic recording medium had a uniform dried thickness of 0.08 mil (2 μm) and showed little evidence of gravure pattern. The dried layer was virtually free from other defects when examined under a microscope.

EXAMPLE 4

A magnetic recording medium has been made in the same manner as in Example 1 except as follows:

1. The flexible carrier web was biaxially oriented poly (ethyleneterephthalate) film having a thickness of 0.18 mil (4.6 μm) and a width of 27.5 inches (700 μm).
2. The gravure-coated bottom-layer dispersion contained nonmagnetic acicular cc-$Fe_2O_3$ particles having a solids content of 33 percent by weight.
3. The dispersion of the extruded top layer employed magnetizable acicular fine-metal (iron) particles having a solids content of 36 percent by weight and a viscosity of 6 cpoise at a shear rate of 10,000 $sec^{-1}$ shear rate.
4. The coating speed was 600 feet/minute (180 meters/minute).
5. The span between idler rolls 24 and 25 was 3.25 inches (82 millimeters) and the distance between upstream idler roll 24 and slot 36 of extrusion die 30 was 1 inch (25 millimeters).
6. Carrier web 19 was under a tension of about 60 $lb_f$ (266 Newtons) between the idler rolls.
7. The convex face of the upstream lip of the die had a uniform radius of curvature $R_1$ of 0.438 inch (11 millimeters) over an angle β of 30 degrees.
8. Smooth face 47 of the downstream lip had a radius of curvature $R_2$ of 0.250 inches (6 millimeters) over an arcuate length of 66 mils (1.7 millimeters) and a flat portion 47a of a length of 50 mils (1.3 millimeters).
9. Arcuate apex 50 of the downstream lip projected a distance H of 22.2 mils (0.56 millimeters) beyond leading edge 50, and the downstream lip was adjusted with respect to the upstream lip so that leading edge 48 was spaced a distance D of 0.1 mils (2.5 μm) below the tangent line t.
10. The gravure layer of the carrier web contacted the convex face of the upstream lip over a wrap angle γ of about five (5) degrees.

After being magnetically oriented and dried, the inner layer of the resulting magnetic recording medium had a uniform dry thickness of 0.055 mil (1.4 μm), and the outer layer had a uniform dry thickness of 0.010 mil (0.25 μm). The resulting layers showed no evidence of a gravure pattern when examined under a microscope, both in reflective and transmissive modes, and when examined by interferometry. The outer magnetizable layer had excellent surface smoothness when examined under a laser interferometer.

While the present invention has been described with respect to it preferred embodiments, it is to be recognized and understood that changes, modifications and alterations in the form and in the details may be made without departing from the scope of the following claims.

What is claimed is:

1. An apparatus for coating a plurality of wet layers on a flexible elongated web, comprising:

advancing means for longitudinally advancing said flexible elongated web in a longitudinal direction;

coating means for applying a first wet layer onto one face of said flexible elongated web;

a pair of spaced guides contacted by an opposite face of said flexible elongated web downstream of said coating means;

tension means for applying tension to said flexible elongated web between said pair of spaced guides;

an extrusion die for applying a second wet layer, said extrusion die having an upstream lip and a downstream lip, each having a side, which sides together define an extrusion slot;

said upstream lip being formed with a face which is substantially straight in a crossweb direction substantially orthogonal to said longitudinal direction, which intersects said side of said upstream lip to form a trailing edge, and at least of portion of which is generally convex with respect to said flexible elongated web generally having a radius of curvature no greater than 200 millimeters; and said downstream lip being formed with a face which is substantially straight in said crossweb direction, which intersects said side of said downstream lip to form a leading edge which is further from said flexible elongated web than a line drawn tangent to said face of said upstream lip at said trailing edge of said upstream lip, which is generally convex from its leading edge at least to an arcuate apex, and which, at said arcuate apex, has a radius of curvature which is from 0.2 to 2.0 times said radius of curvature of said face of upstream lip, which arcuate apex approximately extends to said line; and support means for supporting said extrusion die such that between said spaced guides said first wet layer contacts said portion of said face of said upstream lip.

2. An apparatus as in claim 1 wherein said tension means applies tension to an unsupported span of said flexible elongated carrier web.

3. An apparatus as in claim 2 which further comprises means for supporting said extrusion die such that, at said unsupported span, said first wet layer contacts said face of said upstream lip forming a radius of curvature of said unsupported span of no greater than 50 millimeters and remains in contact with said face of said upstream lip over a wrap angle of γ of at least two degrees and wherein said flexible, elongated web stops contacting said face of said downstream lip approximately tangentially at its trailing corner.

4. An apparatus as in claim 2 wherein said face of said upstream lip is smooth and convex.

5. An apparatus as in claim 4 wherein said face of said upstream lip extends at least 1 millimeter over an angle β of at least 8 degrees in said longitudinal direction.

6. An apparatus as in claim 5 wherein said face of said downstream lip is smooth.

7. An apparatus as in claim 6 wherein said downstream lip has trailing edge which terminates at a trailing corner which is not greater than 120 degrees.

8. Apparatus for manufacturing a multi-layer magnetic recording medium having a plurality of coated layers on a flexible elongated carrier web, which apparatus comprises:

advancing means for longitudinally advancing said flexible elongated carrier web in a longitudinal direction;

coating means for applying a first wet layer of a dispersion of particles and binder onto one face of said flexible elongated carrier web;

a pair of spaced guides contacted by an opposite face of said flexible elongated carrier web downstream of said coating means; tension means for applying tension to said flexible elongated carrier web between said pair of spaced guides;

an extrusion die having an upstream lip and a downstream lip, each having a side, which sides together define an extrusion slot;

said upstream lip being formed with a face which is substantially straight in a crossweb direction substantially orthogonal to said longitudinal direction, which intersects said side of said upstream lip to form a trailing edge, and which, along a line parallel to and at least 0.5 millimeter distant from said trailing edge, has a radius of curvature no greater than 200 millimeters; and said downstream lip being formed with a face is substantially straight in said crossweb direction, which intersects said side of said downstream lip to form a leading edge which is further from said flexible elongated web than a line drawn tangent to said face of said upstream lip at said trailing edge, which is generally convex from its leading edge at least to an arcuate apex, and which, at said arcuate apex, has a radius of curvature which is from 0.2 to 2.0 times said radius of curvature of said face of said upstream lip, which arcuate apex approximately extends to said line; and support means for supporting said extrusion die such that between said spaced guides, said first wet layer can initially contact said face of said upstream lip.

9. An apparatus as in claim 8 wherein said tension means applies tension to an unsupported span of said flexible elongated carrier web.

10. An apparatus as in claim 8 which further comprises means for supporting said extrusion die such that, at an unsupported span of said carrier web, said first wet layer contacts said face of said upstream lip forming a radius of curvature of said unsupported span of no greater than 50 millimeters and remains in contact with said face of said upstream lip over a wrap angle of γ of at least two degrees and wherein said flexible, elongated web stops contacting said face of said downstream lip approximately tangentially at its trailing corner.

11. An apparatus as in claim 8 wherein said face of said upstream lip is smooth and convex.

12. An apparatus as in claim 11 wherein said face of said upstream lip extends at least 1 millimeter over an angle β of at least 8 degrees in said longitudinal direction.

13. An apparatus as in claim 12 wherein said face of said downstream lip is smooth.

14. An apparatus as in claim 13 wherein said trailing edge of said downstream lip terminates at a trailing corner which is not greater than 120 degrees.

15. Apparatus for manufacturing a multi-layer magnetic recording medium, which apparatus comprises:

means for gravure coating a first wet gravure layer of a dispersion of particles and binder onto one face of a flexible elongated carrier web that is being advanced longitudinally;

a pair of spaced guides contacted by an opposite face of said web downstream of said coating means;

means for applying tension to said web across an unsupported span between said spaced guides;

an extrusion die including upstream and downstream lips, each having a side, which sides together define an extrusion slot, said upstream lip being formed with a smooth, convex face which is substantially straight in said crossweb direction of said web, extends at least 1 millimeter over an angle β of at least 8 degrees in said longitudinal direction of said web and intersects said side of said upstream lip to form a trailing edge, and along a line parallel to and at least 0.5 millimeters distant from said trailing edge, has a radius of curvature no greater than 50 millimeters; and said downstream lip being formed with a smooth face which is substantially straight in said crossweb direction of said web, intersects said side of said downstream lip to form a leading edge which cannot be contacted by said gravure layer, is convex from its leading edge at least to an arcuate apex and, at said apex, has a radius of curvature which is from 0.2 to 2.0 times said radius of curvature of said convex face of said upstream lip at its trailing edge, which apex approximately extends to a line tangent to said convex face of said upstream lip at its trailing edge, and terminates at a trailing corner which is not greater than 120 degrees; and means for supporting said extrusion die such that said first wet layer contacts said portion of said face of said upstream lip at such unsupported span of said carried web;

said wet gravure layer can initially contact said convex face of said upstream lip where its radius of curvature is no greater than 50 millimeters and remain in contact with said convex face over a wrap angle γ of at least two degrees; and said web can leave said smooth face of said downstream lip approximately tangentially at its trailing corner.

16. An apparatus as in claim 15 wherein said tension means applies tension to an unsupported span of said flexible elongated carrier web.

17. An apparatus as in claim 16 which further comprises means for supporting said extrusion die such that, at said unsupported span, said first wet layer contacts said face of said upstream lip forming a radius of curvature of said unsupported span of no greater than 50 millimeters and remains in contact with said face of said upstream lip over a wrap angle of γ of at least five degrees and wherein said flexible, elongated web stops contacting said face of said downstream lip approximately tangentially at its trailing corner.

18. An apparatus as in claim 16 wherein said face of said upstream lip is smooth and convex.

19. An apparatus as in claim 18 wherein said face of said downstream lip is smooth.

20. An apparatus as in claim 19 wherein said trailing corner of said downstream lip is approximately 90 degrees.

21. An apparatus as in claim 20 wherein said convex face of said upstream lip has radii of curvature which become progressively larger toward its trailing edge.

22. An apparatus as in claim 21 wherein said radius of curvature of said smooth face of said downstream lip of said extrusion die at its apex is from 0.4 to 1.5 times said radius of curvature of said convex face of said upstream lip adjacent its trailing edge.

23. An apparatus as in claim 22 wherein said smooth face of said downstream lip is substantially flat adjacent its trailing corner.

24. An apparatus as in claim 23 wherein said extrusion head is adjusted so that said gravure layer contacts said convex face of said upstream lip over a wrap angle γ of from 2 degrees to 20 degrees.

25. An apparatus as in claim 24 wherein said position of each of said spaced guides is adjustable to achieve (a) a desired wrap angle γ and (b) a desired attitude of said coated carrier web as it leaves said smooth face of said downstream lip.

26. An apparatus as in claim 25 wherein said smooth convex face of said upstream lip, where it is first contacted by said gravure layer, has a longitudinal radius R according to said formula $$R = \frac{2h}{K(6\eta V/T)^{2/3}}$$

wherein h is said final wet coating thickness, K is a constant from 0.1 to 0.5, V is said web speed, η is said viscosity of said coating at a shear rate at 10,000 sec$^{-1}$, and T is said web tension per unit width.

27. An apparatus as in claim 26 wherein K is from 0.1 to 0.25.

28. An apparatus as in claim 26 wherein said convex face of said upstream lip has multiple radii of curvature ≧R.

29. An apparatus as defined in claim 26 wherein said extrusion head is positioned relative to said gravure layer to allow from 0.5 to 15 millimeters of arcuate contact between said wet gravure layer and said convex face of said upstream lip.

30. An apparatus as in claim 15 wherein said extrusion die has more than one downstream lip, each having a side, which sides together define an extrusion slot between each adjacent pair of downstream lips.

31. An apparatus as in claim 30 wherein said arcuate apex of said smooth face of said downstream lip projects from 0.01 to 0.3 millimeters beyond said leading edge of said downstream lip.

32. An apparatus as in claim 31 wherein said arcuate apex of said smooth face of said downstream lip is positioned from 0 to 0.06 millimeters beyond a line t tangent to said convex face of said upstream lip at its trailing edge so that said tangent line t intersects said smooth face of said downstream lip.

33. A method of coating a plurality of wet layers on a flexible elongated web, comprising the steps of:
advancing said flexible elongated web in a longitudinal direction;
applying a first wet layer onto one face of said flexible elongated web;
applying tension to said flexible elongated web between a pair of spaced guides contacted by an opposite face of said flexible elongated web downstream of said application of said first wet layer;
applying a second we layer with an extrusion die, said extrusion die having an upstream lip and a downstream lip, each having a side, which sides together define an extrusion slot;
said upstream lip being formed with a face which is substantially straight in a crossweb direction substantially orthogonal to said longitudinal direction, which intersects said side of said upstream lip to form a trailing edge, and at least of portion of which is generally convex with respect to said flexible elongated web generally having a radius of curvature no greater than 200 millimeters;
said downstream lip being formed with a face which is substantially straight in said crossweb direction, which intersects said side of said downstream lip to form a leading edge which is further from said flexible elongated web than a line drawn tangent to said face of said upstream lip at said trailing edge, which is generally convex from its leading edge at lest to an arcuate apex, and which, at said arcuate apex, has a radius of curvature which is from 0.2 to 2.0 times said radius of curvature of said face of said upstream lip, which arcuate apex approximately extends to said line; and
supporting said extrusion die such that between said spaced guides said first wet layer contacts said portion of said face of said upstream lip.

34. A method as in claim 33 wherein tension is applied to an unsupported span of said flexible elongated carrier web.

35. A method as in claim 34 wherein said face of said upstream lip is smooth and convex.

36. A method as in claim 35 wherein said face of said upstream lip extends at least 1 millimeter over an angle β of at least 8 degrees in said longitudinal direction.

37. A method as in claim 36 wherein said face of said downstream lip is smooth.

38. A method as in claim 37 wherein said trailing edge of said downstream lip terminates at a trailing corner which is not greater than 120 degrees.

39. A method for manufacturing a multi-layer magnetic recording medium having a plurality of coated layers on a flexible elongated carrier web, comprising the steps of:
longitudinally advancing said flexible elongated carrier web in a longitudinal direction;
applying a first wet layer of dispersion of particles and binder onto one face of said flexible elongated carrier web;
applying tension to said flexible elongated carrier web between a pair of spaced guides contacted by an opposite face of said flexible elongated carrier web downstream of said application of said first wet layer,
applying a second wet layer with an extrusion die having an upstream lip and a downstream lip, each having a side, which sides together define an extrusion slot;
said upstream lip being formed with a face which is substantially straight in a crossweb direction substantially orthogonal to said longitudinal direction, which intersects said side of upstream lip to form a trailing edge, and which, along a line parallel to and at least 0.5 millimeter distant from said trailing edge, has a radius of curvature no greater than 200 millimeters; and
said downstream lip being formed with a face which is substantially straight in said crossweb direction, which intersects said side of said downstream lip to form a leading edge which is further from said flexible elongated web than a line drawn tangent to said face of said upstream lip at said trailing edge, which is convex from its leading edge at least to an arcuate apex, and which, at said arcuate apex, has a radius of curvature which is from 0.2 to 2.0 times said radius of curvature of said face of said upstream lip, which arcuate apex approximately extends to said line; and supporting said extrusion die such that between said spaced guides, said wet layer can initially contact said face of said upstream lip and remains in contact with said face of said upstream lip over a wrap angle γ of at least 5 degrees.

40. A method as in claim 39 wherein said applying a first wet layer step comprises gravure coating a first wet layer.

41. A method as in claim 40 wherein tension is applied to an unsupported span of said flexible elongated carrier web.

42. A method as in claim 41 which further comprises supporting said extrusion die such that, at said unsupported span, said first wet layer contacts said face of said upstream lip forming a radius of curvature of said unsupported span of no greater than 50 millimeters and remains in contact with said face of said upstream lip over a wrap angle of γ of at least five degrees and wherein said flexible, elongated web stops contacting said face of said downstream lip approximately tangentially at its trailing corner.

43. A method as in claim 41 wherein said face of said upstream lip is smooth and convex.

44. A method as in claim 43 wherein said face of said upstream lip extends at least 1 millimeter over an angle D of at least 8 degrees in said longitudinal direction.

45. A method as in claim 44 wherein said face of said downstream lip is smooth.

46. A method as in claim 45 wherein said trailing edge of said downstream lip terminates at a trailing corner which is not greater than 120 degrees.

* * * * *